United States Patent

Boakes

Patent Number: 5,878,123
Date of Patent: Mar. 2, 1999

[54] SYSTEM AND METHOD FOR PROCESSING MULTIPLE CALL APPEARANCES USING A LIMITED DISPLAY

[75] Inventor: Edward W. Boakes, Middletown, N.J.

[73] Assignee: Lucent Technologies Inc., Murray Hill, N.J.

[21] Appl. No.: 808,369

[22] Filed: Feb. 28, 1997

[51] Int. Cl.[6] ............................ H04M 1/56; H04M 15/06; H04M 3/00; H04M 1/00

[52] U.S. Cl. .......................... 379/142; 379/245; 379/246; 379/156; 379/164

[58] Field of Search .................................... 379/142, 156, 379/157, 164, 171, 245, 246, 247, 257, 118, 120, 165, 166, 172, 173, 177, 198, 244

[56] References Cited

U.S. PATENT DOCUMENTS

| | | | |
|---|---|---|---|
| 5,119,413 | 6/1992 | Okumura et al. | 379/156 |
| 5,121,423 | 6/1992 | Morihiro et al. | 379/142 |
| 5,373,551 | 12/1994 | Baals et al. | 379/110 |
| 5,381,461 | 1/1995 | Baals et al. | 379/457 |
| 5,386,460 | 1/1995 | Boakes et al. | 379/142 |
| 5,471,525 | 11/1995 | Domoto et al. | 379/142 |
| 5,487,104 | 1/1996 | Baals et al. | 379/96 |
| 5,652,788 | 7/1997 | Masahiko | 379/156 |
| 5,712,909 | 1/1998 | Masahiko | 379/156 |
| 5,754,642 | 5/1998 | Domoto et al. | 379/156 |

*Primary Examiner*—Paul Loomis
*Assistant Examiner*—Rexford Barnie

[57] ABSTRACT

A telephone system and method that enables a telephone to handle more call appearances that it has call appearance keys. The telephone system contains a display and general purpose keys that are used to respond to prompts shown on the display. When the telephone system receives an incoming call that is not assigned to a dedicated call appearance key, then the system places a prompt on the display. The prompt identifies the line upon which the telephone call is received by placing an identifying name, number or telephone location on the display. The prompt is placed adjacent to one of the general purpose keys so that the prompt is clearly associated with only one of the general purpose keys. The system then assigns that general purpose key to the telephone line addressed by the prompt. As a result, the general purpose key becomes a call appearance key and a person using the telephone system can complete a connection between that telephone an incoming call by pressing that general purpose key.

11 Claims, 3 Drawing Sheets

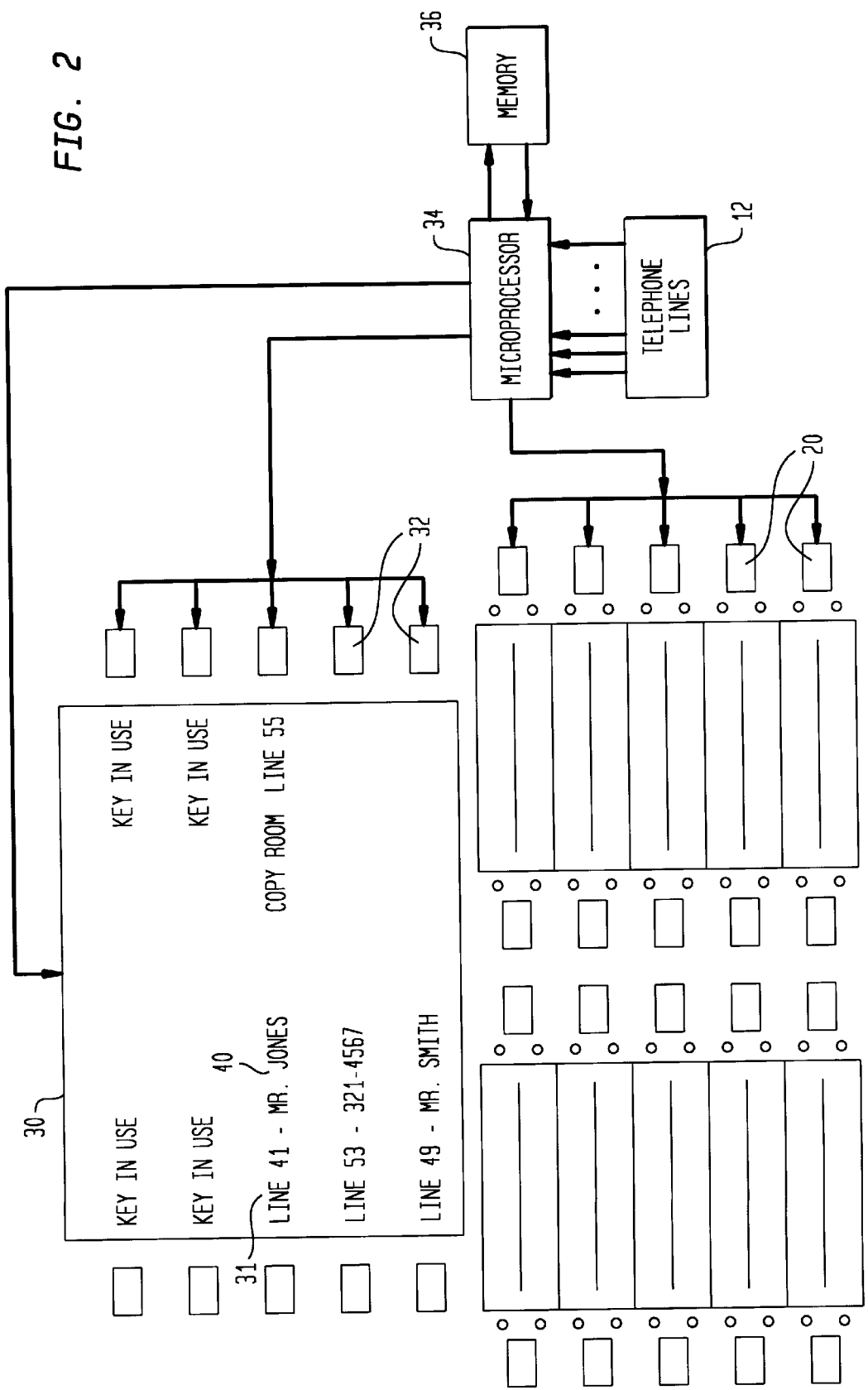

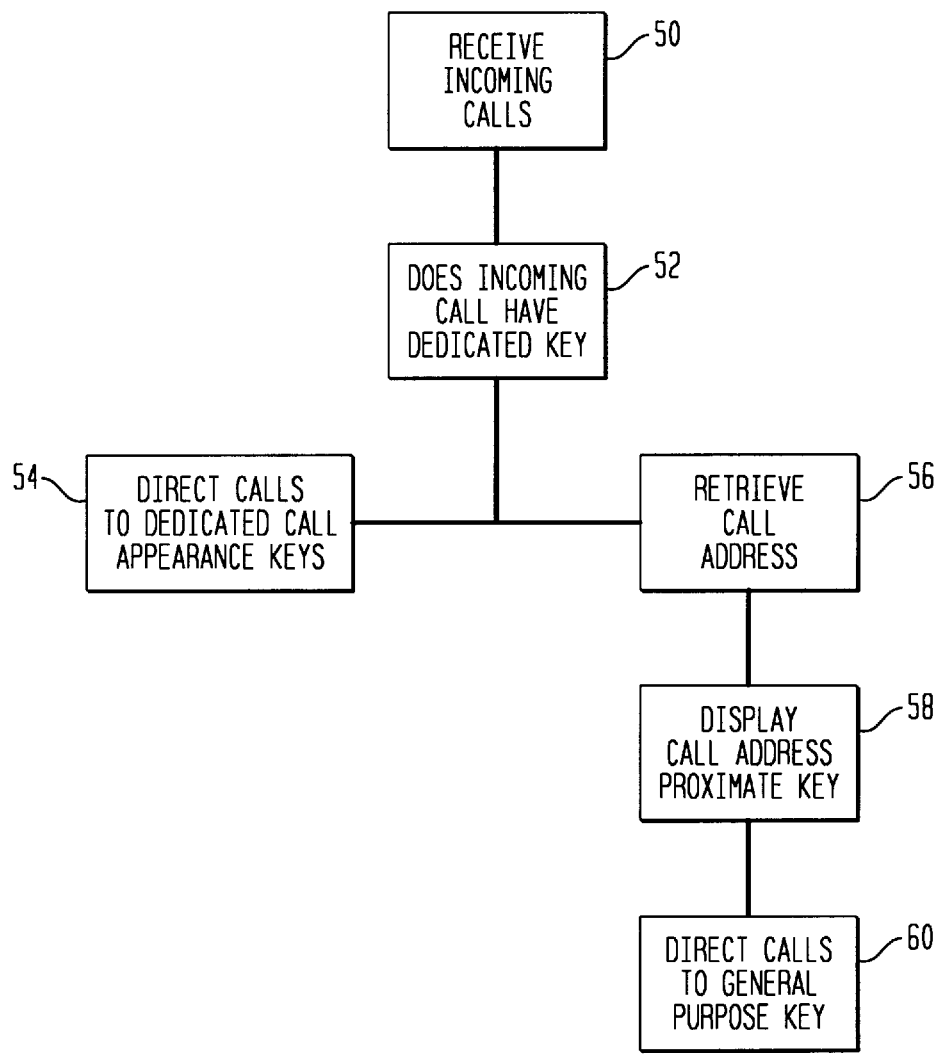

SYSTEM AND METHOD FOR PROCESSING MULTIPLE CALL APPEARANCES USING A LIMITED DISPLAY

BACKGROUND OF THE INVENTION

1. Field of the Invention

The present invention relates to telephone systems and related methods that use a limited number of call appearance keys yet receive and process numerous call appearances in excess of the call appearance keys available.

2. Description of the Prior Art

Many businesses have multiple telephone lines. In fact, it is common in a business for most every employee to have his/her own telephone number. Often businesses buy telephone systems that use a central telephone unit located at a receptionist's desk or at the front desk of the business. The central telephone unit receives all the incoming call appearances directed to employees of that business. The receptionist fields the incoming call and then directs the call to the appropriate line in the system.

The central telephone unit often has dedicated call appearance keys, wherein each call appearance key is assigned to a different telephone number. As a result, a receptionist can tell what number was dialed by viewing the call appearance key that flashes when an incoming call appearance is received. If the telephone number dialed is specific to one of the business' employees, the receptionist can tell for whom a received call belongs and can either answer the call or direct the call accordingly. For example, in a company Mr. Jones may have a telephone with his own telephone number. When a person calls the company using Mr. Jones' telephone number a specific call appearance key will flash at the receptionist's central telephone unit. Recognizing that the incoming call was received on Mr. Jones' number, the receptionist can either answer the call on behalf of Mr. Jones or direct the call to Mr. Jones directly.

As a business grows, the number of telephone lines used by that business may eventually outnumber the call appearance keys present on the receptionist's central telephone unit. When this happens, many different telephone lines are often grouped together at the same call appearance key on the central telephone unit. As a result, the receptionist can no longer tell from what number an incoming call appearance is being received. Consequently, the receptionist must answer the incoming call and must inquire about its purpose and destination. This places much larger duties on the receptionist and results in many calls being placed on hold for longer periods of time.

A need therefore exists in the art for a central telephone unit that is specifically designed to handle more incoming call appearances than there are dedicated call appearance keys. As such, a receptionist can tell for whom an incoming call is directed without a company having to upgrade to more sophisticated telephone equipment having a larger dedicated call appearance capacity.

SUMMARY OF THE INVENTION

The present invention is a telephone system and method that enables a telephone to handle more call appearances that it has call appearance keys. The telephone system contains a display and general purpose keys that are used to respond to prompts shown on the display. When the telephone system receives an incoming call that is not assigned to a dedicated call appearance key, then the system places a prompt on the display. The prompt identifies the line upon which the telephone call is received by placing an identifying name, number or telephone location on the display. The prompt is placed adjacent to one of the general purpose keys so that the prompt is clearly associated with only one of the general purpose keys. The system then assigns that general purpose key to the telephone line addressed by the prompt. As a result, the general purpose key becomes a call appearance key and a person using the telephone system can complete a connection between that telephone an incoming call by pressing that general purpose key.

BRIEF DESCRIPTION OF THE DRAWINGS

For a better understanding of the present invention, reference is made to the following description of an exemplary embodiment thereof, considered in conjunction with the accompanying drawings, in which:

FIG. 2 is an enlarge view of the display screen and dedicated call appearance keys from the exemplary telephone of FIG. 1; and FIG. 3 is block diagram schematic showing a logic flow for one method of operation of the present invention.

DETAILED DESCRIPTION OF THE DRAWINGS

Figure 1:
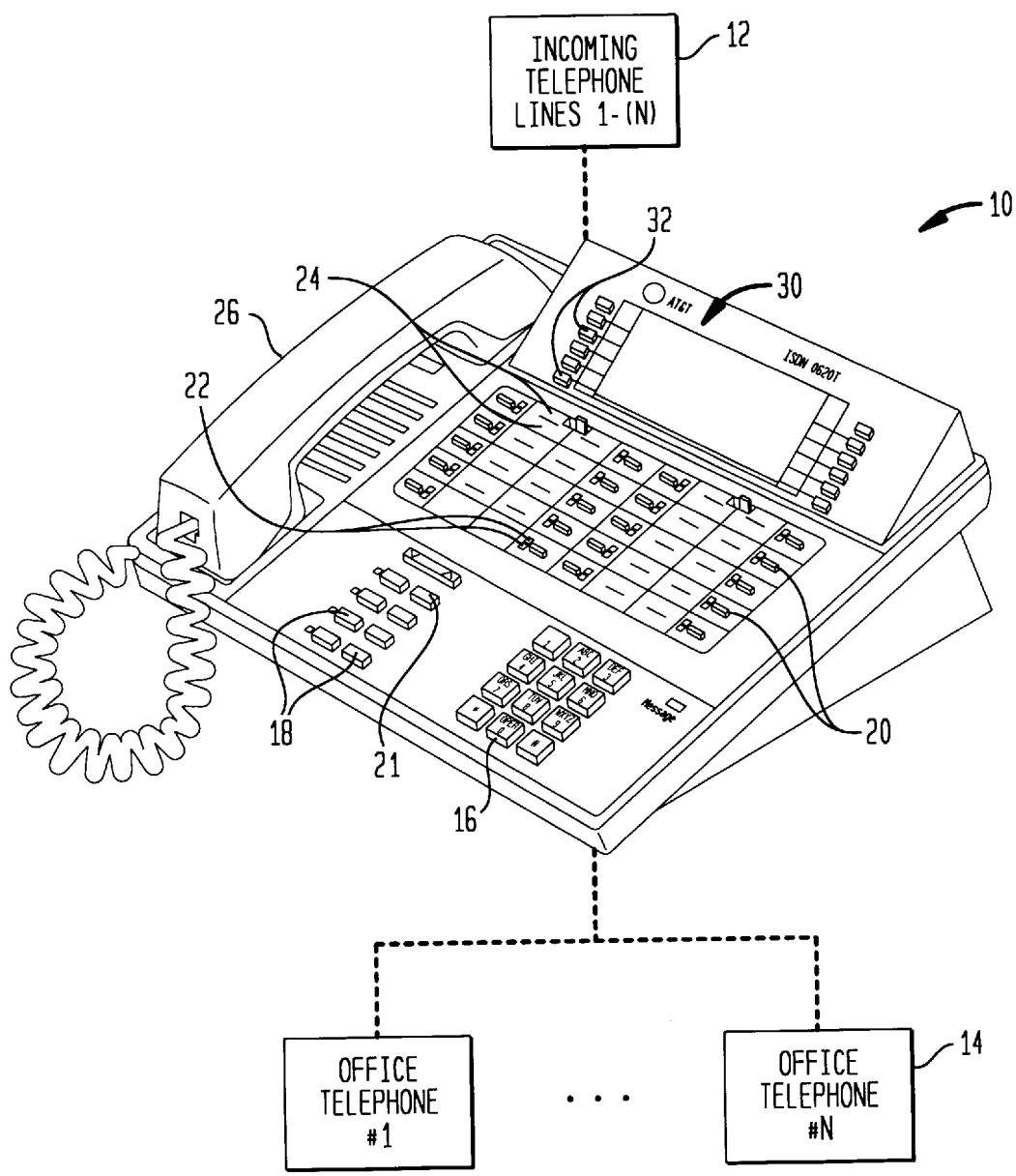
FIG. 1 is a block diagram schematic showing an intended use of an exemplary embodiment of the present invention telephone system.

Referring to FIG. 1, an exemplary central telephone unit 10 is shown in accordance with the present invention. The central telephone unit 10 is coupled to some number (N) of incoming telephone lines 12, wherein each telephone line 12 has its own telephone number. The central telephone unit 10 is also coupled to a plurality of office telephones 14, wherein the purpose of the central telephone unit 10 is to connect a call incoming on one of the telephone lines 12 to one of the office telephones 14.

The central telephone unit 10 contains dial keys 16, function keys 18 and a set number of dedicated call appearance keys 20. The dial keys 16 are used for dialing numbers and include keys for the numbers zero through nine plus an asterisk (*) key and a pound (#) key. Such dial keys 16 are commonplace on Touch Tone$^{SM}$ telephones. The function keys 18 include keys common to central telephone units such as a shift key 21, hold key, transfer key, redial key and the like.

The dedicated call appearance keys 20 are each assigned to at least one of the incoming telephone lines 12. In the shown embodiment, each of the call appearance keys 20 is assigned to two different incoming telephone lines 12. For this reason two LEDs 22 are present next to each of the call appearance key 20. A text space 24 is present next to each of the LEDs 22. An address name or number is typically written into each text space 24 so that a person using the telephone can tell to what telephone line 12 each call appearance key 20 is assigned.

When a call is received on a telephone line that is assigned to one of the call appearance keys 20, the LED 22 next to that call appearance key 20 blinks and the central telephone unit 10 rings. To answer that incoming call, the receptionist lifts the handset 26 and presses the call appearance key 20 next to the flashing LED 22. If the higher of the two LEDs 22 is flashing, the receptionist simply presses the call appearance key 20 adjacent that LED 22. If the lower of the two LEDs 22 is flashing, the receptionist may have to press a shift function key 21 in addition to the call appearance key 20 adjacent the flashing LED 22. These actions connect the telephone handset 26 to the incoming call. The receptionist can then answer the incoming call and/or direct the incoming call to one of the office telephones 14 by pressing the appropriate sequence of function keys 18 and keypad keys 16.

Since the receptionist can read the name or number written into the text space 24 next to the flashing LED 22, the receptionist is aware of what incoming telephone line 12-the incoming call is using. For example, if the text space 24 next to one of the call appearance keys 20 has the identifier "Mr. Jones" written therein, then a receptionist would be able to tell that an incoming call is for Mr. Jones when the LED 22 next to that call appearance key 20 flashes.

In the shown embodiment there are twenty call appearance keys 20. Since each call appearance key 20 is assigned to two incoming telephone lines 12, the system is capable of dedicating a call appearance key 20 to forty separate incoming telephone lines 12. However, if the number (N) of incoming telephone lines 12 is in excess of the available dedicated call appearance keys 20, then the bank of call appearance keys 20 is no longer adequate.

Above the bank of call appearance keys 20 is a display 30. General purpose keys 32 are positioned on either side of the display 30 so that a user can respond to prompts shown on the display 30. Referring to FIG. 2, it can be seen that the display 30 and the general purpose keys 32 can be used to supplement the call appearance keys 20 by simulating the function of the call appearance keys 20 when needed. As has been previously stated, the dedicated call appearance keys 20 are capable of handling forty different incoming telephone lines 12. When a telephone call is received on the 41st incoming telephone line or any other telephone line over forty, then the central telephone unit does not have the physical capacity to direct the incoming call to one of the call appearance keys 20. Rather, the incoming call is directed to the display 30.

As can be seen from FIG. 2, when a telephone call is received on a telephone line 12 above the capacity of the call appearance keys 20, then that call is assigned to one of the general purpose keys 32 by a digital processor, for example, microprocessor 34. The microprocessor 34 recognizes what incoming telephone line 12 is being used and retrieves prompts from a memory 36 that identifies that telephone line 12. In the shown embodiment, the microprocessor 34 provides a line prompt 38 on the display 30 that shows what telephone line 12 the incoming call is arriving upon. The microprocessor 34 also provides an address prompt 40 that indicates to a receptionist the address to the incoming call. The second address prompt can be a name of a person, a telephone location or a number sequence. The line prompt 38 and the address prompt 40 are positioned on the display 30 next to one of the general purpose keys 32. The proximity of the prompts adjacent to the general purpose key identifies which of the general purpose keys correspond to the prompts.

Once a general purpose key 32 is assigned the task of receiving a call appearance, the receptionist can use that general purpose key 32 as though it were just another call appearance key. For example, in FIG. 2 four general purpose keys 32 are being used as call appearance keys. The third general purpose key 32 being used has a line prompt of "49" and an address prompt of "Mr. Smith". As such, when the receptionist presses the general purpose key 32 next to those prompts, the receptionist can tell that he/she is answering incoming line number 53, which is Mr. Smith's telephone line. Once the general purpose key 32 is pressed, the receptionist can answer the incoming call or can transfer the call directly to Mr. Smith.

In FIG. 2, it can be seen that the general purpose keys 32 are not dedicated to specific incoming telephone lines 12. Rather, incoming calls float in the system. The first incoming call that does not have a dedicated call appearance key 20 is assigned to the first available general purpose key 32 regardless of what incoming telephone line 12 that call is received on. In the shown embodiment, the first two general purpose keys 32 on either side of the display 30 were being used for functions not part of this invention. As a result, the system used the first available general purpose key 32 below the keys in use.

Referring to FIG. 3, a logic flow schematic illustrating an exemplary method of operation of the present invention is shown. From block 50 of FIG. 3, it can be seen that the central telephone unit 10 (FIG. 1) first receives an incoming call on one of the telephone lines 12 (FIG. 1) connected to that central telephone unit. The central telephone unit contains a microprocessor 34 (FIG. 2) and a memory 36 (FIG. 2). The microprocessor recognizes the telephone line upon which the incoming call is received. As indicated by block 52 and block 54, if the incoming call has its own dedicated call appearance key 20 (FIG. 1), then that call is directed to that call appearance key. However, as indicated by block 56, block 58 and block 60, if the incoming call does not have its own dedicated call appearance key, then a line prompt 38 (FIG. 2) and an address prompt 40 (FIG. 2) for that incoming line are retrieved from memory. The line prompt and the address prompt are then displayed on the telephone's display 30 (FIG. 2) next to the next available general purpose key 32 (FIG. 2). The microprocessor then directs the call to that general purpose key so that general purpose key functions in the same manner as does a dedicated call appearance key. As a result, a person using the telephone system completes a connection between the telephone system and an incoming call by pressing the general purpose key having the address prompt corresponding to that incoming call.

It will be understood that the embodiment of the present invention specifically shown and described is merely exemplary and that a person skilled in the art can make alternate embodiments using different configurations and functionally equivalent components. For example, in all the embodiments shown in the figures, a telephone unit was described having touchable keys. It will be understood that the present invention telephone system can be reduced to software run by a computer with a modem, wherein dedicated telephone keys can be replaced with keyboard keys, screen prompts and operation of a mouse. All such alternate embodiments are intended to be included in the scope of this invention as set forth in the following claims.

What is claimed is:

1. In a telephone application where a customer location has a plurality of telephone lines that are respectively dedicated to different telephone stations within the customer location, a telephone receptionist system for connecting call appearances between the telephone lines and the telephone stations, comprising:

a display;

a plurality of keys adjacent said display, wherein said plurality of keys is less in number than the plurality of telephone lines;

a memory including an address prompt for each of the telephone stations that identifies each of the telephone stations;

a microprocessor coupled to said memory, said display and said plurality of keys, wherein said microprocessor retrieves an address prompt, that corresponds to a telephone station, when a call appearance is received on a corresponding one of the telephone lines, and wherein said microprocessor displays said address prompt on said display proximate one key from said plurality of keys and said microprocessor assigns said one key to said call appearance to act as a call appearance key, utilization of said one key enabling said call appearance to be answered from said telephone receptionist system and subsequently transferred to said telephone station.

2. The device according to claim 1, further including a plurality of dedicated call access keys capable of addressing a predetermined number of said plurality of telephone lines.

3. The device according to claim 1, wherein said address prompt is selected from a group consisting of names, number sequences and telephone locations.

4. In a telephone application where a customer location has a plurality of telephone lines that are dedicated to different telephone stations within the customer location, a method of managing incoming calls from a telephone including a display and a plurality of keys for responding to prompts on said display, comprising the steps of:

(a) displaying an address prompt on the display for each telephone station addressed by a call appearance on one of said telephone lines, wherein said address prompt identifies one of said plurality of keys;

(b) assigning the key identified by said address prompt to the telephone station identified by said address prompt, wherein a connection is completed between said telephone station and said call appearance by utilizing the key having the address prompt corresponding to that telephone station.

5. The method according to claim 4, wherein said telephone has dedicated call appearance keys that are assigned to some of said plurality of telephone lines and method step (a) and (b) are performed for incoming calls received on telephone lines not assigned to a dedicated call appearance key.

6. The method according to claim 5 wherein said plurality of keys are located proximate said display and said address prompt identifies one of said keys by its physical proximity to that key.

7. The method according to claim 5 wherein said address prompt is selected from a group consisting of a name, a number sequence, a line number and a telephone location.

8. The method according to claim 5, wherein said step of displaying an address prompt includes the substeps of:

identifying which of said plurality of keys is not in use; and displaying the address prompt adjacent the first of said plurality of keys found not to be in use.

9. A telephone unit capable of receiving incoming call appearances from a plurality of telephone lines and directing the incoming call appearances to telephone stations that are dedicated to the various telephone lines, said telephone unit comprising:

a display;

a plurality of general keys identifiable by the location of prompts on said display;

a plurality of dedicated call appearance keys wherein a first portion of said telephone lines are assigned to said call appearance keys and a second portion are not;

a memory including an address prompt for each of the telephone stations, an address prompt identifying respective telephone stations;

a microprocessor coupled to said memory, said display and said plurality of general keys wherein said microprocessor retrieves an address prompt that corresponds to a telephone station, when a call appearance is received on one of said second portion of said telephone lines, and wherein said microprocessor displays said address prompt on said display proximate one general key from said plurality of general keys for each incoming call appearance that is received on a telephone line contained within said second portion of said telephone lines, and said microprocessor assigns said one general key to each such incoming call appearance, a connection being completed between said telephone unit and said incoming call appearance by pressing said general key having the address prompt corresponding to that incoming call appearance, said call appearance enabled to be transferred to said corresponding telephone station thereafter.

10. The telephone unit according to claim 9, wherein said address prompt is selected from a group consisting of names, number sequences and telephone locations.

11. The telephone unit to claim 9, wherein the general keys are positioned proximate said display so that a position of each said address prompt on said display is adjacent to a separate one of said general keys.

* * * * *